US009616953B2

(12) United States Patent
Tsai (10) Patent No.: US 9,616,953 B2
(45) Date of Patent: Apr. 11, 2017

(54) ADJUSTABLE SEAT POST FOR BICYCLES (71) Applicant: Chin-Sung Tsai, New Taipei (TW)

(72) Inventor: Chin-Sung Tsai, New Taipei (TW)

(*) Notice: Subject to any disclaimer, the term of this patent is extended or adjusted under 35 U.S.C. 154(b) by 85 days.

(21) Appl. No.: 14/824,450

(22) Filed: Aug. 12, 2015

(65) Prior Publication Data
US 2017/0043832 A1 Feb. 16, 2017

(51) Int. Cl.
*B62J 1/08* (2006.01)
(52) U.S. Cl.
CPC ............ *B62J 1/08* (2013.01); *B62J 2001/085* (2013.01)
(58) Field of Classification Search
CPC .......... B62J 1/06; B62J 1/08; B62J 2001/085; B62K 19/36
USPC ............. 248/631; 297/215.13–215.15, 195.1
See application file for complete search history.

(56) References Cited

U.S. PATENT DOCUMENTS

2012/0104809 A1* 5/2012 Hsu ........................... B62J 1/08
297/215.13
2014/0112703 A1* 4/2014 Chen ......................... B62J 1/08
403/109.2
2015/0191208 A1* 7/2015 Hsu ........................... B62J 1/06
403/322.3

FOREIGN PATENT DOCUMENTS

DE 202015006966 U1 * 10/2015 ................ B62J 1/08

* cited by examiner

*Primary Examiner* — Melanie Torres Williams
(74) *Attorney, Agent, or Firm* — Withrow & Terranova, P.L.L.C.

(57) ABSTRACT

An adjustable seat post for bicycles has a control assembly, an installing tube assembly, a connecting tube assembly, and an adjustable element. The control assembly has a control-wheel and a curved-portion formed on an external surface of the control-wheel. The installing tube assembly is connected to the control assembly. The connecting tube assembly is movably mounted in the installing tube assembly and has a connecting tube. The connecting tube is mounted in the installing tube assembly. The adjustable element is assembled in the connecting tube assembly and has a trigger element formed in a bottom end of the adjustable element and abutting the control-wheel. The curved-portion is arc-shaped, such that the curved-portion abuts the trigger element at one point of contact. Therefore, the contact area between the control-wheel and the trigger element is minimized.

8 Claims, 6 Drawing Sheets

ADJUSTABLE SEAT POST FOR BICYCLES

BACKGROUND OF THE DISCLOSURE

1. Field of the Disclosure

The present disclosure relates to a seat post for bicycles, and more particularly to an adjustable seat post for bicycles that can facilitate smooth and laborsaving operation of the adjustable seat post.

2. Description of Related Art

Bicycles are common transport tools, and can assist a cyclist to transport between different places or travel to different scenic spots in a short time. The bicycles are easy to operate and environmentally friendly, as the cyclist only needs to step on two pedals of the bicycle to form a driving force to the bicycle. So the bicycles are convenient transport tools in use.

The cyclist needs to adjust a height of a seat post of a bicycle according to the stature of the cyclist, so as to maintain a proper distance between two legs of the cyclist and two pedals of the bicycle. Then, the cyclist can maintain a good posture when riding the bicycle, and this can prevent the cyclist from sport injury. At the same time, the pedaling action can be laborsaving and have the highest operational efficiency.

A conventional adjustable seat post apparatus is mounted on a bicycle and has an adjustable element. The conventional adjustable seat post apparatus may vary the height of the seat post by the force between the gravity of the cyclist's weight and an upward abutting force of the adjustable element. However, for the conventional adjustable element, the cyclist needs to apply a great force to drive a trigger element of the adjustable element. Therefore, the conventional adjustable element is laborious for operation and the operational efficiency is low. In the process of adjusting the height of the saddle, as the cyclist sits on the saddle, a shift in a center of gravity of the cyclist, which is caused by the cyclist's changing posture would increase the difficulty of adjusting the height of the saddle.

To overcome the shortcomings of the conventional adjustable seat post apparatus, the present disclosure provides an adjustable seat post for bicycles to mitigate or obviate the aforementioned problems.

SUMMARY OF THE DISCLOSURE

The main objective of the present disclosure is to provide an adjustable seat post for bicycles that is laborsaving and can be operated conveniently.

The adjustable seat post for bicycles has a control assembly, an installing tube assembly, a connecting tube assembly, and an adjustable element. The control assembly has a control-wheel and a curved-portion formed on an external surface of the control-wheel. The installing tube assembly is connected to the control assembly. The connecting tube assembly is movably mounted in the installing tube assembly and has a connecting tube. The connecting tube is mounted in the installing tube assembly. The adjustable element is assembled in the connecting tube assembly and has a trigger element formed in a bottom end of the adjustable element and abutting the control-wheel.

The connecting tube may ascend or descend via the curved-portion of the control-wheel that contacts the trigger element of the adjustable element, and the cyclist can make the control-wheel rotate by pulling a pulling-element. Additionally, the curved-portion of the control-wheel is arc-shaped, such that the curved-portion abuts the trigger element at one point of contact. Therefore, the contact area between the control-wheel and the trigger element is minimized, and the cyclist can vary the height of the saddle in a laborsaving way. And the present disclosure could be operated conveniently.

Other objects, advantages, and novel features of the disclosure will become more apparent from the following detailed description when taken in conjunction with the accompanying drawing.

DETAILED DESCRIPTION OF PREFERRED EMBODIMENT

Figure 1:
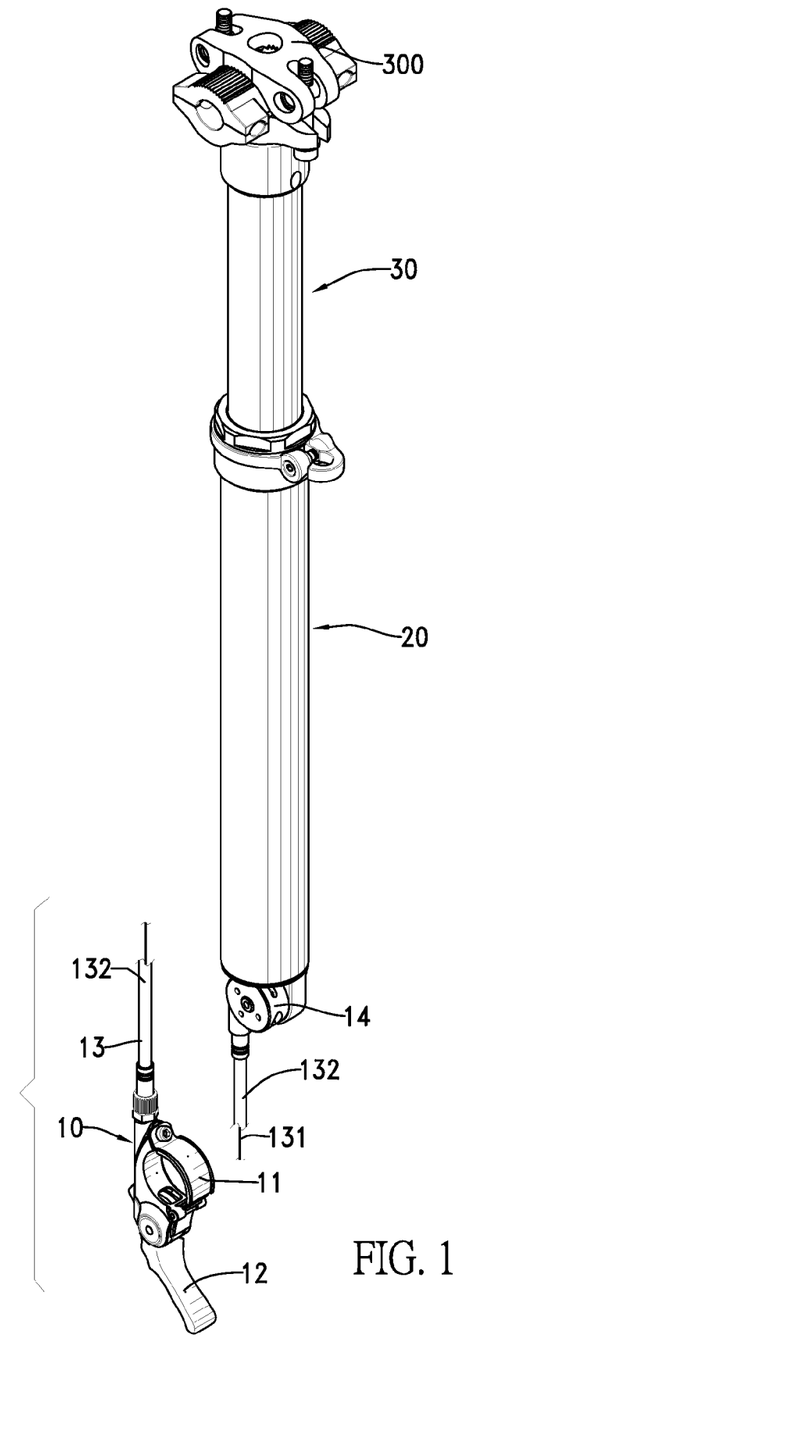
FIG. 1 is a perspective view of an adjustable seat post for bicycles in accordance with the present disclosure.
Figure 2:
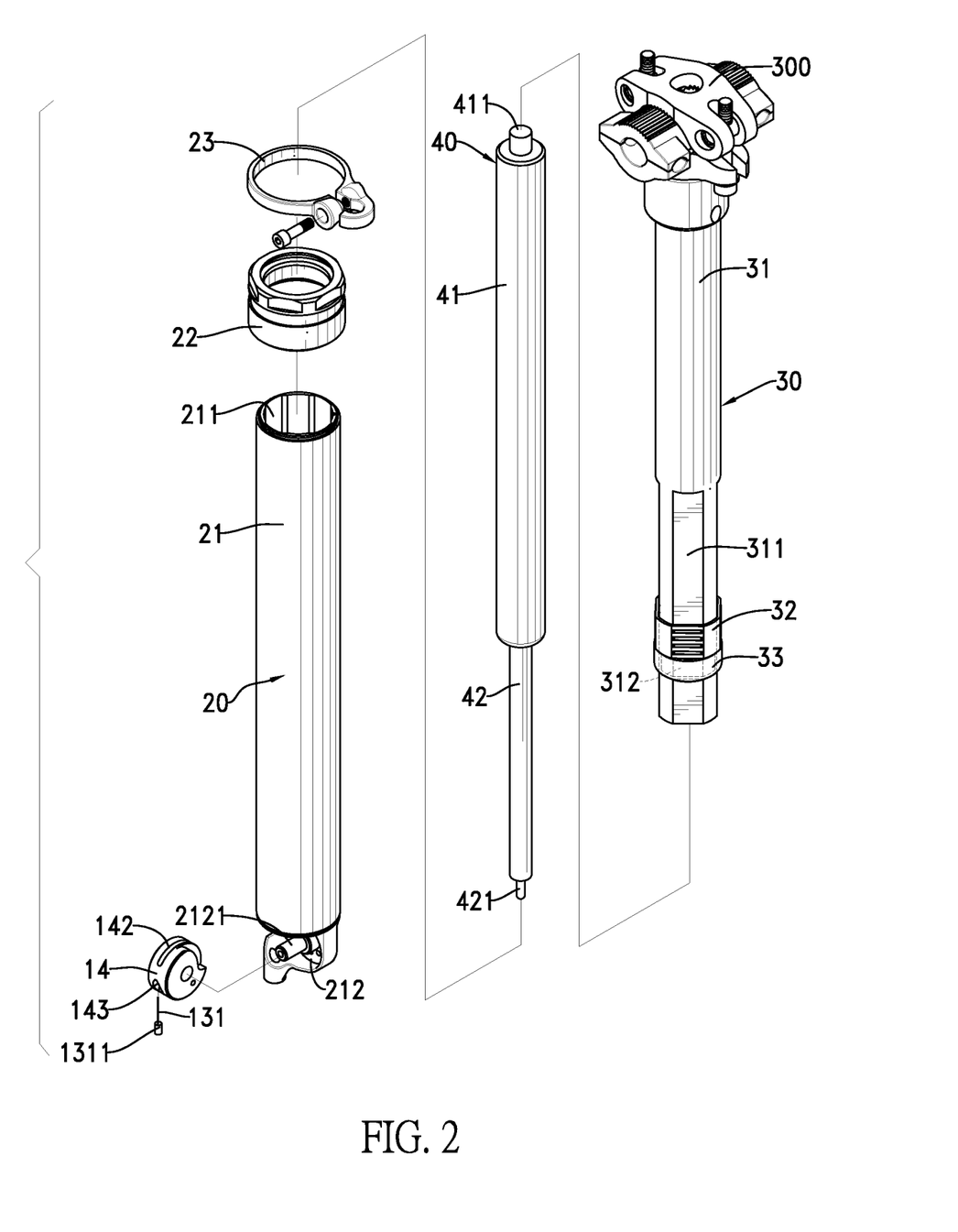
FIG. 2 is an exploded perspective view of the adjustable seat post for bicycles in FIG. 1.

With reference to the FIGS. 1 and 2, an adjustable seat post for bicycles in accordance with the present disclosure comprises a control assembly 10, an installing tube assembly 20, a connecting tube assembly 30, and an adjustable element 40. In operation, the adjustable seat post of the disclosure is mounted in a frame of a bicycle.

The control assembly 10 is mounted on the frame of the bicycle and has a connecting-base 11, a pressing-button 12, a pulling-element 13, and a control-wheel 14. The connecting-base 11 is mounted on the frame of the bicycle and has a buckle ring mounted around a handlebar of the bicycle, and this makes a user operate the control assembly 10 conveniently. The pressing-button 12 is pivotally connected to the connecting-base 11. The pulling-element 13 is connected to the pressing-button 12 and has a driving-rope 131 and a protecting-tube 132. The driving-rope 131 has a first end, a second end, and a head 1311. The head 1311 is formed on the first end of the driving-rope 131. The protecting-tube 132 is mounted around the driving-rope 131 and has a first end and a second end, and the first end of the protecting-tube 132 is fixed on the connecting-base 11. The first end and the second end of the driving-rope 131 extend out of the first end and the second end of the protecting-tube 132 respectively.

Figure 3:
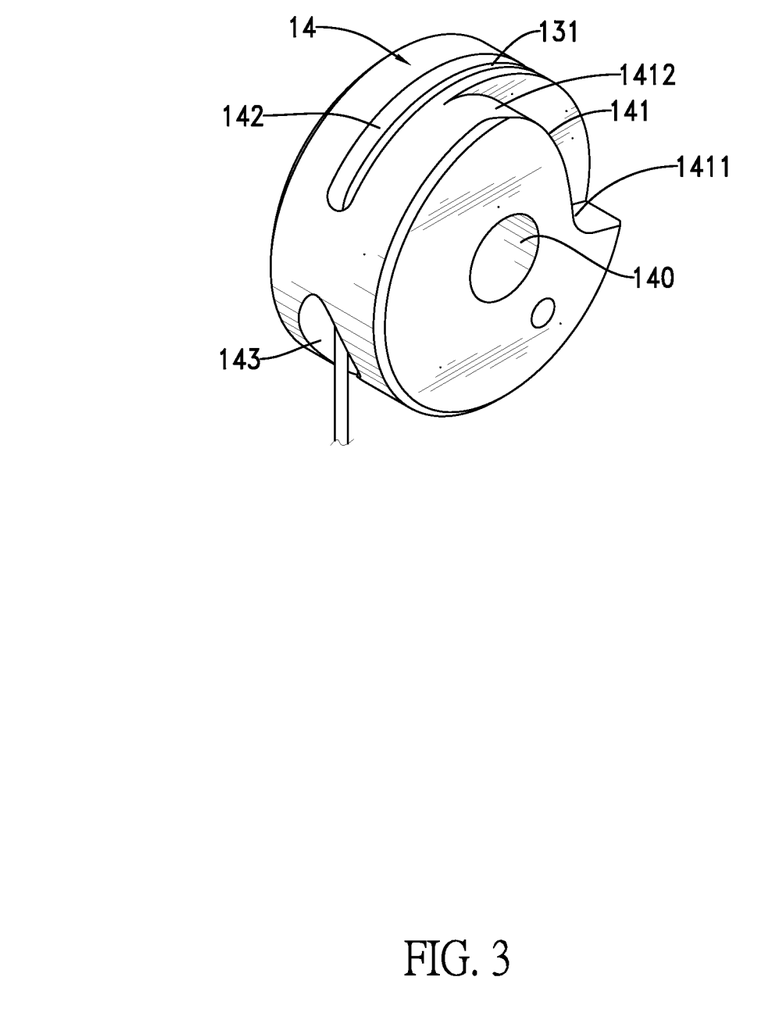
FIG. 3 is an enlarged perspective view of a control-wheel of the adjustable seat post for bicycles in FIG. 2.

With reference to FIG. 3, the control-wheel 14 is connected to the second end of the protecting-tube 132. The control-wheel 14 has two side surfaces, an external surface, a mounting-hole 140, a curved-portion 141, a groove 142, and an engaging-recess 143. The mounting-hole 140 is formed through a center of each one of the side surfaces of the control-wheel 14 and has a center. The curved-portion 141 is formed in the external surface of the control-wheel 14 and is arc-shaped. The curved-portion 141 has a first side, a second side, a first contact portion 1411, and a second contact portion 1412. The first contact portion 1411 and the second contact portion 1412 of the curved-portion 141 are formed on the first side and the second side of the curved-portion 141 respectively. A radial distance between the first contact portion 1411 and the center of the mounting-hole 140 is smaller than a radial distance between the second contact portion 1412 and the center of the mounting-hole 140.

The groove 142 is concaved inward in the external surface of the control-wheel 14 and has two ends, and the engaging-recess 143 is formed in one of the two ends of the groove 142. The control-wheel 14 has a connecting hole formed between the groove 142 and the engaging-recess 143. The engaging-recess 143 enables the head 1311 of the driving-rope 131 to be mounted in the control-wheel 14. The connecting hole between the groove 142 and the engaging-recess 143 enables the driving-rope 131 to be mounted through the control-wheel 14 and coiled in the groove 142. Therefore, the control-wheel 14 can be rotated by pulling the driving-rope 131 of the pulling-element 13.

Figure 4:
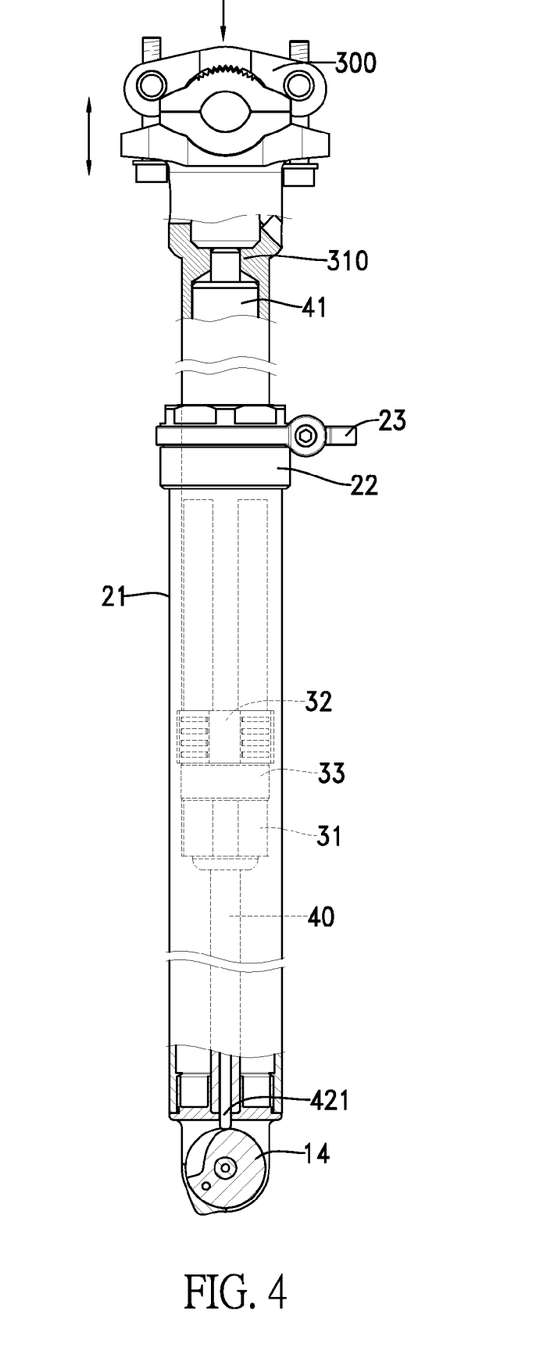
FIG. 4 is a side view in partial section of the adjustable seat post for bicycles in FIG. 1.

With reference to the FIGS. 2 and 4, the installing tube assembly 20 is pivotally connected to the control-wheel 14 of the control assembly 10 and has a mounting-tube 21, an assembling-ring 22, and a fastening-ring 23. The mounting-tube 21 is hollow and has a top end, a bottom end, an internal surface, an external surface, a first assembling portion 211, and a mounting portion 212. The installing tube assembly 20 is fixed on the second end of the protecting-tube 132.

The first assembling portion 211 is formed on the internal surface of the mounting-tube 21 and adjacent to the top end of the mounting-tube 21, and has an internal surface. The mounting portion 212 is formed on the bottom end of the mounting-tube 21 and has a pivot rod 2121. The pivot rod 2121 is formed on and horizontally protrudes from the mounting portion 212. The pivot rod 2121 of the mounting-tube 21 is mounted through the mounting-hole 140 of the control-wheel 14, such that the control-wheel 14 is selectively rotated relative to the pivot rod 2121 of the mounting-tube 21 by pulling the driving-rope 131.

The assembling-ring 22 is a hollow ring, is mounted around the external surface of the mounting-tube 21 and adjacent to the first assembling portion 211, and has an external surface. The fastening-ring 23 is mounted around the external surface of the assembling-ring 22. The fastening-ring 23 has an external surface, an inner diameter, a threaded hole, and a screw. The threaded hole is transversely formed on the external surface of the fastening-ring 23. The screw of the fastening-ring 23 is mounted through the threaded hole of the fastening-ring 23, such that the inner diameter of the fastening-ring 23 may be adjusted by rotating the screw of the fastening-ring 23. Therefore, the fastening-ring 23 may force the assembling-ring 22 tightly to hold the assembling-ring 22 securely on the mounting-tube 21.

With reference to FIGS. 1 and 2, the connecting tube assembly 30 is movably mounted in the installing tube assembly 20 and adjacent to the assembling-ring 22 and the fastening-ring 23. The connecting tube assembly 30 has a connecting tube 31, a positioning sheath 32, a limiting ring 33, and a mounting base 300.

With reference to FIGS. 2 and 4, the connecting tube 31 is a hollow tube, is mounted in the mounting-tube 21, and has an external surface, an internal surface, a top end, a bottom end, a second assembling portion 311, a mounting recess 312, and a supporting portion 310. The second assembling portion 311 is formed on the external surface of the connecting tube 31 and adjacent to the bottom end of the connecting tube 31, and has an external surface. The second assembling portion 311 is mounted in the first assembling portion 211 of the mounting-tube 21, and the connecting tube 31 may move in a vertical direction relative to the mounting-tube 21. The assembling-ring 22 abuts the external surface of the connecting tube 31 since the fastening-ring 23 fastens the assembling-ring 22 securely.

The mounting recess 312 is radially formed in the external surface of the second assembling portion 311. The supporting portion 310 is formed in the internal surface of the connecting tube 31 and adjacent to the top end of the connecting tube 31. The mounting base 300 is mounted on the supporting portion 310 of the connecting tube 31, and the mounting base 300 is applied to be connected to a saddle of the bicycle.

With reference to the FIG. 4, the positioning sheath 32 is mounted around the external surface of the second assembling portion 311 of the connecting tube 31 and has a bottom end. The positioning sheath 32 is located in the first assembling portion 211 of the mounting-tube 21. The positioning sheath 32 abuts respectively the internal surface of the first assembling portion 211 and the external surface of the second assembling portion 311 at sliding contact.

With reference to the FIGS. 2 and 4, the limiting ring 33 is mounted around the mounting recess 312 of the connecting tube 31 and abuts the bottom end of the positioning sheath 32, and this makes the positioning sheath 32 remain at the second assembling portion 311 of the connecting tube 31, thereby limiting a position of the positioning sheath 32.

With reference to FIGS. 2 and 4, the adjustable element 40 is assembled in the connecting tube 31 of the connecting tube assembly 30 and abuts the control-wheel 14 of the control assembly 10. Preferably, the adjustable element 40 selectively abuts the first contact portion 1411 and the second contact portion 1412. The adjustable element 40 has a moving rod 41 and an assembling rod 42.

Figure 5:
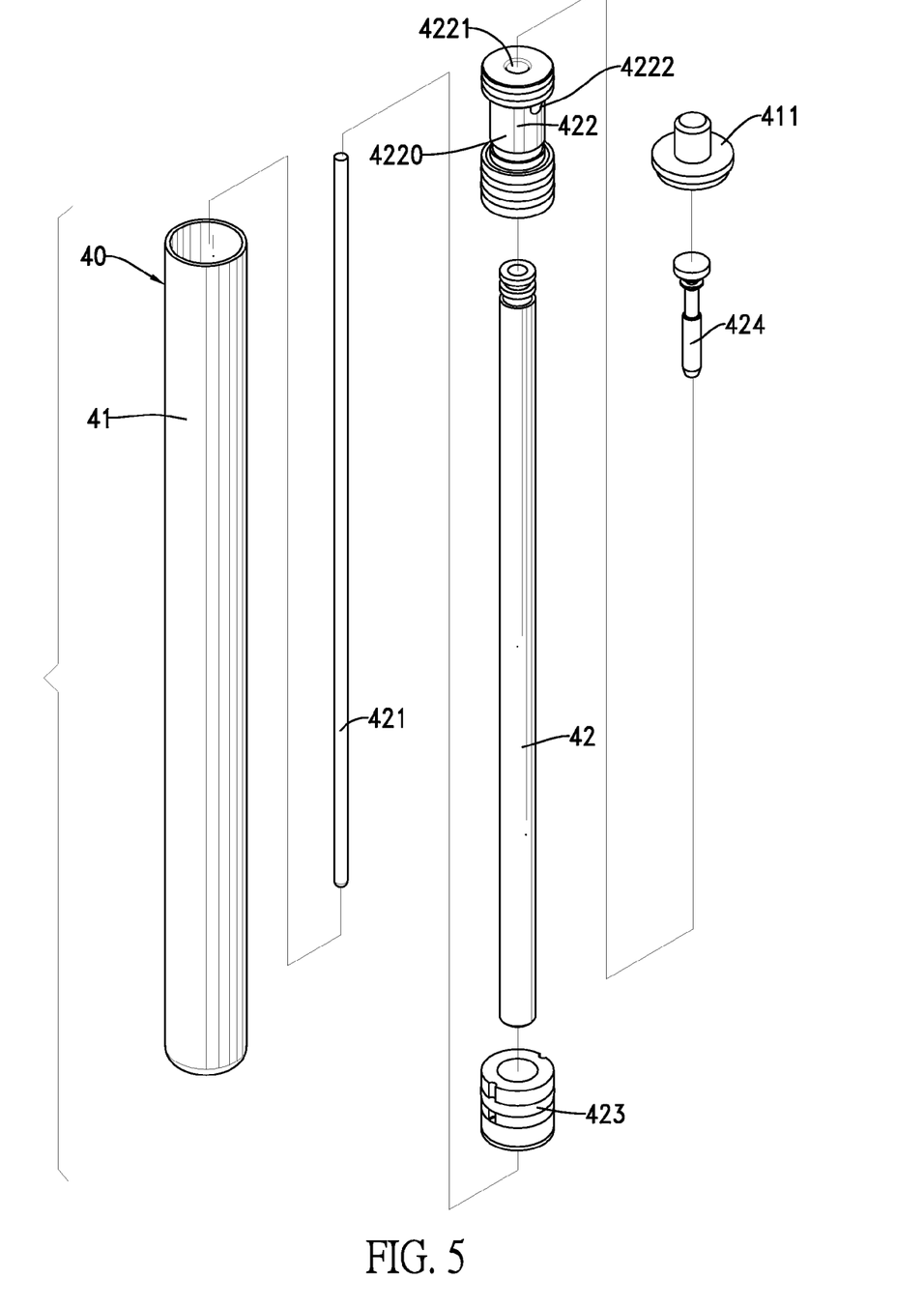
FIG. 5 is a further exploded perspective view of an adjustable element of the adjustable seat post for bicycles in FIG. 2.
Figure 6:
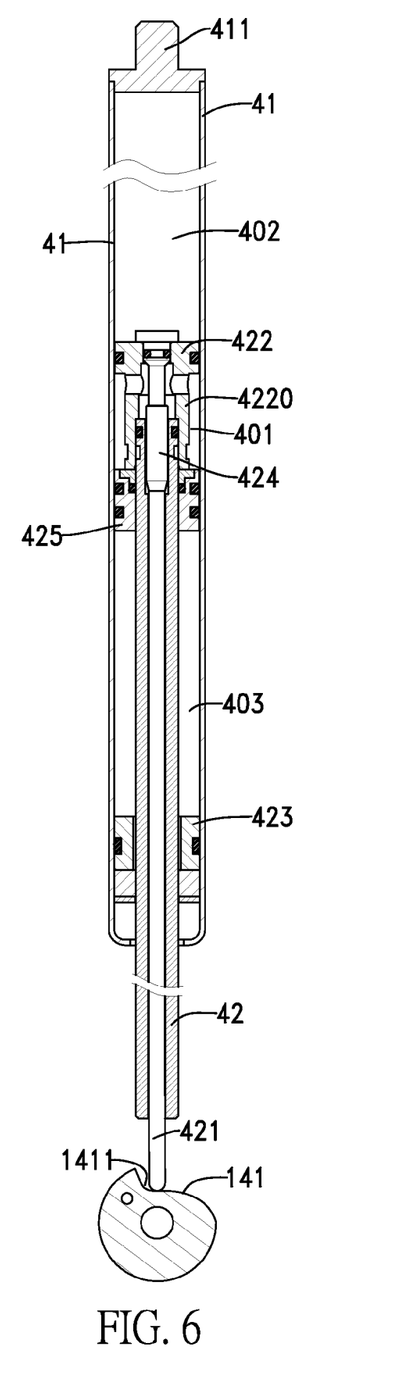
FIG. 6 is a cross sectional side view of the adjustable seat post for bicycles in FIG. 1.

With reference to FIGS. 2, 5, and 6, the moving rod 41 is hollow and is mounted in the connecting tube 31 and has a top end, a bottom end, an inner diameter, an internal surface, and an abutting element 411. The abutting element 411 is mounted on the top end of the moving rod 41 and abuts the supporting portion 310.

The assembling rod 42 is hollow, is mounted in the moving rod 41, and has a top end, a bottom end, an outer diameter, an external surface, a trigger element 421, a valve base 422, a sealing block 423, a valve element 424, and a movable block 425. The outer diameter of the assembling rod 42 is smaller than the inner diameter of the moving rod 41. The trigger element 421 is axially mounted through the assembling rod 42, and is moved relative to the assembling rod 42 in an axial direction. The trigger element 421 has a top end and a bottom end, and the bottom end of the trigger element 421 abuts the first contact portion 1411 or the second contact portion 1412 of the curved-portion 141.

The valve base 422 is mounted around the external surface of the assembling rod 42 and adjacent to the top end of the assembling rod 42. The valve base 422 has a top surface, a bottom surface, an external surface, a recessed portion 4220, a flow channel 4221, and multiple through holes 4222. The recessed portion 4220 is radially formed in the external surface of the valve base 422. The flow channel 4221 is axially formed through the top surface and the bottom surface of the valve base 422, and has a top end and a bottom end. The top end of the assembling rod 42 is mounted through the bottom end of the flow channel 4221. The through holes 4222 are radially formed through the recessed portion 4220 and communicate with the flow channel 4221.

The sealing block 423 is mounted around the external surface of the assembling rod 42 and adjacent to the bottom end of the assembling rod 42. The valve element 424 is mounted through the top end of the flow channel 4221 and is movable relative to the valve base 422 in an axial direction. The valve element 424 has a bottom end. The bottom end of the valve element 424 abuts the top end of the trigger element 421. The movable block 425 is movably mounted in the moving rod 41, and may move between the valve base 422 and the sealing block 423. The valve base 422, the sealing block 423, and the movable block 425 abut the internal surface of the moving rod 41.

The adjustable element 40 has a first chamber 401 formed between the recessed portion 4220 of the assembling rod 42, the moving rod 41, and the movable block 425, and a volume of the first chamber 401 is variable.

In addition, the adjustable element 40 further has a second chamber 402 formed between the valve base 422, the valve element 424, the abutting element 411, and the moving rod 41. The first chamber 401 and the second chamber 402 are filled with a working liquid, such as hydraulic oil. Furthermore, the adjustable element 40 has a third chamber 403 formed between the internal surface of the moving rod 41, the sealing block 423, and the movable block 425. The third chamber 403 is filled with compressed gas. The moving rod 41 selectively moves relative to the assembling rod 42 in an axial direction. The adjustable element 40 is conventional, and detailed description thereof will be omitted.

The trigger element 421 of the assembling rod 42 selectively abuts the curved-portion 141 of the control-wheel 14, and specifically, the trigger element 421 of the assembling rod 42 selectively abuts the first contact portion 1411 or the second contact portion 1412.

Figure 7:
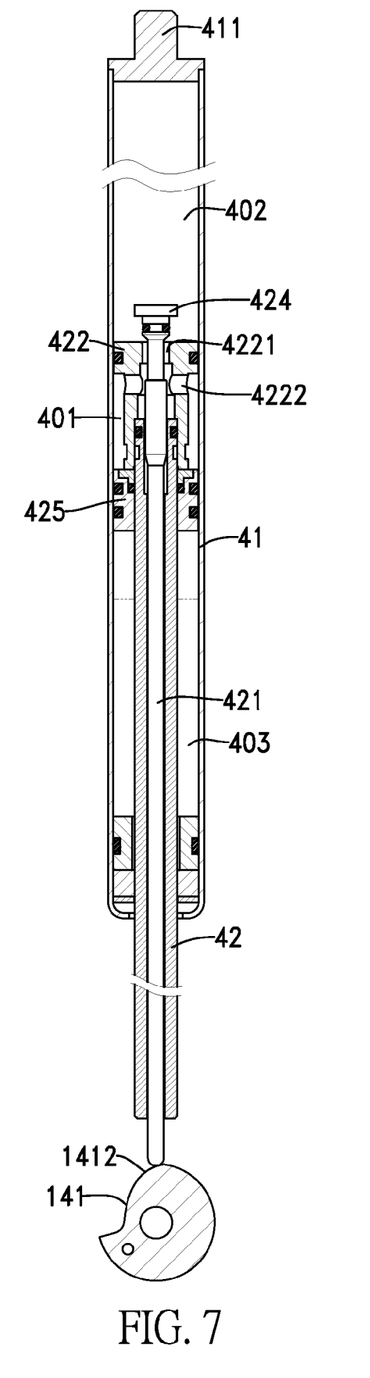
FIG. 7 is an operational cross sectional side view of the adjustable seat post for bicycles in FIG. 1.

With reference to FIGS. 4 and 7, when a cyclist would like to adjust the height of the saddle of the bicycle, the cyclist presses the pressing-button 12 of the control assembly 10, and this makes the pulling-element 13 drive the control-wheel 14 to rotate. The trigger element 421 of the assembling rod 42 is moved upward by the second contact portion 1412 of the curved-portion 141 abutting the trigger element 421. Then, the flow channel 4221 of the valve base 422 is open.

When the flow channel 4221 is open, the working liquid in the second chamber 402 is compressed due to force of the cyclist's weight transmitted downwardly in the sequence of the saddle, the mounting base 300, the connecting tube 31, and the abutting element 411 of the moving rod 41. Then, the working liquid in the second chamber 402 flows into the first chamber 401 via the flow channel 4221 and the through holes 4222, which makes the connecting tube 31 and the moving rod 41 move downward relative to the mounting-tube 21 and the assembling rod 42. The working liquid in the first chamber 401 pushes the movable block 425, thereby moving the movable block 425 toward the sealing block 423.

So the volume of the first chamber 401 becomes larger, and the working liquid in the second chamber 402 may flow into the first chamber 401. At the same time, the pressure of the compressed gas between the sealing block 423 and the movable block 425 become higher. When the saddle of the bicycle is adjusted to a proper height, the cyclist releases the pressing-button 12, and then the control-wheel 14 is rotated back to the original position, thereby moving the trigger element 421 downward to seal the valve base 422. With reference to FIG. 6, the working liquid in the first chamber 401 and the second chamber 402 remain in the original state.

When the cyclist would like to raise the saddle, the cyclist presses the pressing-button 12, and the trigger element 421 abuts the valve element 424, and this makes the valve element 424 separate from the valve base 422. At the same time, the compressed gas in the third chamber 403 pushes the movable block 425 to move toward the valve base 422, such that the working liquid in the first chamber 401 flows into the second chamber 402 via the through holes 4222 and the flow channel 4221, so the moving rod 41 moves upward relative to the assembling rod 42. The abutting element 411 abuts the supporting portion 310 of the connecting tube 31, and the connecting tube 31 moves upward relative to the mounting-tube 21 by the moving rod 41 abutting the connecting tube 31, and then the saddle is raised.

From the above description, it is noted that the present disclosure has the following advantages: the connecting tube 31 may ascend or descend via the curved-portion 141 of the control-wheel 14 that contacts the trigger element 421 of the adjustable element 40, and the cyclist can make the control-wheel 14 rotate by pulling the pulling-element 13. Additionally, the curved-portion 141 of the control-wheel 14 is arc-shaped, such that the curved-portion 141 abuts the trigger element 421 at one-point contact. Therefore, a contact area between the control-wheel 14 and the trigger element 421 is minimized, and the cyclist can adjust the height of the saddle in a laborsaving way, and the present disclosure can be operated conveniently.

Even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:
1. An adjustable seat post for bicycles comprising:
   a control assembly having
      a connecting-base;
      a pressing-button pivotally connected to the connecting-base;
      a pulling-element connected to the pressing-button; and
      a control-wheel connected to the pulling-element and having
         a center;
         two side surfaces;
         an external surface;
         a curved-portion formed in the external surface of the control-wheel and being arc-shaped, the curved-portion having
            a first side;
            a second side;
            a first contact portion;
            a second contact portion; and
      wherein the first contact portion and the second contact portion of the curved-portion are formed on the first side and the second side of the curved-portion respectively, a radial distance between the first contact portion and the center of the control-wheel is smaller than a radial distance between the second contact portion and the center of the control-wheel, and the control-wheel is rotated by driving the pulling-element;
   an installing tube assembly pivotally connected to the control-wheel of the control assembly and having a top end and a bottom end;
   a connecting tube assembly movably mounted in the installing tube assembly and adjacent to the top end of the installing tube assembly; and
   an adjustable element assembled in the connecting tube assembly and having a bottom end; and
   a trigger element formed in the bottom end of the adjustable element and abutting the control-wheel of the control assembly, and the trigger element selectively abutting the first contact portion or the second contact portion.

2. The adjustable seat post for bicycles as claimed in claim 1, wherein
the control-wheel has a mounting-hole formed through the two side surfaces of the control-wheel, wherein a radial distance between the first contact portion and the mounting-hole is smaller than a radial distance between the second contact portion and the mounting-hole; and
the installing tube assembly has
a mounting-tube being hollow and having
a top end;
a bottom end; and
a mounting portion formed on the bottom end of the mounting-tube and connected to the pulling-element of the control assembly, and the mounting portion having a pivot rod formed on and horizontally protruding from the mounting portion, the pivot rod of the mounting-tube mounted through the mounting-hole of the control-wheel.

3. The adjustable seat post for bicycles as claimed in claim 2, wherein
the mounting-tube has
an internal surface; and
a first assembling portion formed on the internal surface of the mounting-tube and adjacent to the top end of the mounting-tube;
the connecting tube assembly has
a connecting tube mounted in the mounting-tube and having
an external surface;
an internal surface;
a top end;
a bottom end;
a second assembling portion formed on the external surface of the connecting tube and adjacent to the bottom end of the connecting tube, and having an external surface; and
a mounting recess radially formed in the external surface of the second assembling portion;
a positioning sheath mounted around the external surface of the second assembling portion of the connecting tube and having a bottom end, the positioning sheath abutting respectively an internal surface of the first assembling portion and the external surface of the second assembling portion at sliding contact;
a limiting ring mounted around the mounting recess of the connecting tube and abutting the bottom end of the positioning sheath; and
a mounting base mounted on the top end of the connecting tube.

4. The adjustable seat post for bicycles as claimed in claim 3, wherein
the connecting tube has a supporting portion formed in the internal surface of the connecting tube and adjacent to the top end of the connecting tube;
the adjustable element has
a moving rod mounted in the connecting tube and having
a top end;
a bottom end; and
an abutting element mounted on the top end of the moving rod and abutting the supporting portion;
an assembling rod mounted in the moving rod and having atop end; and
wherein the top end of the assembling rod is mounted on the bottom end of the moving rod.

5. The adjustable seat post for bicycles as claimed in claim 1, wherein
the pulling-element has
a driving-rope having
a first end;
a second end; and
a head formed on the first end of the driving-rope; and
a protecting-tube mounted around the driving-rope and having
a first end fixed on the connecting-base; and
a second end fixed on the installing tube assembly;
the control-wheel has
a groove concaved inward in the external surface of the control-wheel and having two ends;
an engaging-recess formed in one of the two ends of the groove with a connecting hole formed between the groove and the engaging-recess; and
wherein the engaging-recess enables the head of the driving-rope to be mounted in the control-wheel, the connecting hole between the groove and the engaging-recess enables the driving-rope to be mounted through the control-wheel and coiled in the groove.

6. The adjustable seat post for bicycles as claimed in claim 2, wherein
the pulling-element has
a driving-rope having
a first end;
a second end; and
a head formed on the first end of the driving-rope; and
a protecting-tube mounted around the driving-rope and having
a first end fixed on the connecting-base; and
a second end fixed on the installing tube assembly;
the control-wheel has
a groove concaved inward in the external surface of the control-wheel and having two ends;
an engaging-recess formed in one of the two ends of the groove with a connecting hole formed between the groove and the engaging-recess; and
wherein the engaging-recess enables the head of the driving-rope to be mounted in the control-wheel, the connecting hole between the groove and the engaging-recess enables the driving-rope to be mounted through the control-wheel and coiled in the groove.

7. The adjustable seat post for bicycles as claimed in claim 3, wherein
the pulling-element has
a driving-rope having
a first end;
a second end; and
a head formed on the first end of the driving-rope; and
a protecting-tube mounted around the driving-rope and having
a first end fixed on the connecting-base; and
a second end fixed on the installing tube assembly;
the control-wheel has
a groove concaved inward in the external surface of the control-wheel and having two ends;
an engaging-recess formed in one of the two ends of the groove with a connecting hole formed between the groove and the engaging-recess; and
wherein the engaging-recess enables the head of the driving-rope to be mounted in the control-wheel, the connecting hole between the groove and the engaging-recess enables the driving-rope to be mounted through the control-wheel and coiled in the groove.

8. The adjustable seat post for bicycles as claimed in claim 4, wherein
the pulling-element has
a driving-rope having
a first end;
a second end; and
a head formed on the first end of the driving-rope; and
a protecting-tube mounted around the driving-rope and having
a first end fixed on the connecting-base; and
a second end fixed on the installing tube assembly;
the control-wheel has
a groove concaved inward in the external surface of the control-wheel and having two ends;
an engaging-recess formed in one of the two ends of the groove with a connecting hole formed between the groove and the engaging-recess; and
wherein the engaging-recess enables the head of the driving-rope to be mounted in the control-wheel, the connecting hole between the groove and the engaging-recess enables the driving-rope to be mounted through the control-wheel and coiled in the groove.

\* \* \* \* \*